United States Patent
Saito et al.

(10) Patent No.: US 7,236,558 B2
(45) Date of Patent: Jun. 26, 2007

(54) THREE-DIMENSIONAL IMAGE DISPLAY DEVICE CREATING THREE-DIMENSIONAL IMAGE DIRECTLY FROM PROJECTION DATA

(75) Inventors: Motoaki Saito, Tokyo (JP); Kazuo Takahashi, Tokyo (JP)

(73) Assignee: TeraRecon, Inc., San Mateo, CA (US)

( * ) Notice: Subject to any disclaimer, the term of this patent is extended or adjusted under 35 U.S.C. 154(b) by 0 days.

(21) Appl. No.: 11/177,218

(22) Filed: Jul. 7, 2005

(65) Prior Publication Data
US 2007/0009078 A1 Jan. 11, 2007

(51) Int. Cl.
*H05G 1/60* (2006.01)
(52) U.S. Cl. .......................................... 378/4; 378/901
(58) Field of Classification Search ................. 378/4, 378/21, 901; 600/407
See application file for complete search history.

(56) References Cited

U.S. PATENT DOCUMENTS

2002/0141531 A1* 10/2002 Taguchi ....................... 378/19
2002/0172408 A1* 11/2002 Saito et al. .................. 382/132
2004/0062342 A1* 4/2004 Cahill ............................ 378/4
2004/0081340 A1* 4/2004 Hashimoto .................. 382/128
2004/0101104 A1* 5/2004 Avinash et al. .......... 378/98.12
2004/0116797 A1* 6/2004 Takahashi et al. .......... 600/407
2006/0039533 A1* 2/2006 Weil et al. ..................... 378/65
2006/0256111 A1* 11/2006 Chihoub et al. ............. 345/424

FOREIGN PATENT DOCUMENTS

JP 2002-383174 7/2004

* cited by examiner

Primary Examiner—Courtney Thomas
Assistant Examiner—Alexander Taningco
(74) Attorney, Agent, or Firm—Blakely Sokoloff Taylor & Zafman LLP

(57) ABSTRACT

An imaging device accesses projection data collected by a medical imaging system during a scan of a body. The imaging device uses the projection data directly to render an image of a region of interest of the body.

23 Claims, 4 Drawing Sheets

THREE-DIMENSIONAL IMAGE DISPLAY DEVICE CREATING THREE-DIMENSIONAL IMAGE DIRECTLY FROM PROJECTION DATA

FIELD OF THE INVENTION

This invention relates to a three-dimensional image display device which creates three-dimensional images directly from the projection data of an X-ray computerized tomography (CT) device.

BACKGROUND

X-ray CT apparatuses are used to irradiate with X-rays a subject when the periphery of a subject who is lying on the side is irradiated on the table top of a bed. Because the intensity of the X-rays transmitted through the subject is detected with an X-ray detector, projection data can be collected on the horizontal profile of the subject. After the table top of the bed has then been moved, the next projection data can be collected in the same manner for the next horizontal profile (transverse cross-section), so that the projection data can be collected repeatedly by moving the table top until multiple transverse cross-sections of projection data of the subject have been collected by repeating the table top moving and projection data collecting operations. The projection data corresponding to multiple transverse cross-sections of a subject is then processed with a high-speed data processing apparatus and image reconstruction processing is conducted to obtain image data containing multiple transverse cross-sections of a given patient.

When X-ray CT apparatuses are used to obtain scanned data, projection data is collected in multiple transverse cross-sections with an X-ray CT device, image data is created for multiple cross-section when image reconstruction processing is applied to the projection data of multiple transverse cross-section with a high-speed data processing device and the image data of these multiple transverse cross-sections is displayed with a display device, so that a laser image or the like can be created of the images of these multiple transverse cross-sections, or burnt on a film which can be observed. An abnormal region of a subject can thus be observed with these operations which are widely used. This made it possible to realize a method wherein image data ranging from several pages to hundreds of pages can be recreated initially with an X-ray CT device.

According to recent methods used for scanning of data with and X-ray CT device, projection data of multiple transverse cross-section is collected with an X-ray CT device, image reconstruction processing is applied to the projection data of these multiple transverse cross-sections with a high-speed data processing device, and image data corresponding to multiple transverse cross-section is created, and this image data of multiple transverse cross-sections is stored in electromagnetic disk devices, optomagnetic disk devices, optical disk devices, and other types of magnetic media. The image data of the multiple transverse cross-sections stored in this magnetic media is then read so that the image data can be displayed on a display device and observed. In addition, when the image data of the multiple transverse cross-sections, which has been stored in this magnetic media, is read, image processing can be applied to these images in an image processing device. For example, a three-dimensional construction can be created from this image data with a three-dimensional image display device so that three-dimensional images can then be observed.

With the initial X-ray devices, a subject was lying on the side and irradiated with x-rays of a moving table top, enabling reciprocal collection of the projection data of the subject in this manner. However, as the technology used in X-ray CT devices underwent a rapid progress, projection data was collected with the latest X-ray CT devices, so that the subject was lying on the side and X-ray irradiation was performed simultaneously with the movements of the table top. This method for collection of projection data is called helical scanning.

Because projection data was collected with the initial X-ray devices when a subject was lying on the side and X-ray irradiation was applied together with the movements of the table top for reciprocal collection of the projection data, the transverse cross-section of the collected projection data was created as a transverse cross-section of image data obtained with reconstructed image data. Specifically, since the transverse cross-section of the image data obtained with the reconstructed image data corresponded to the transverse cross-section of the collected data, the number of the transverse cross-sections of the collected image data was identical to the number of the pages of the image data obtained when image reconstruction operations were performed. In addition, the positions of the transverse cross-sections containing collected projection data were distributed in a dispersed fashion in the body axial direction of the patient. Incidentally, when projection data is collected while simultaneous X-ray irradiation operations are conducted with the helical scanning method, transverse cross-sections of dispersed collected projection data are not present. Because of that, virtual transverse cross-sections are set so that interpolation processing is applied to the projection data to determine projection data corresponding to the virtual transverse cross-sections, and the projection data of these virtual transverse-cross-sections is used when image reconstruction operations are performed.

Because virtual transverse cross-sections of this projection data can be set with a considerable amount of freedom, this also makes it possible to select, with a considerable amount of freedom, the number of pages of the image data that can be obtained from the image reconstruction processing with a sequential setting of virtual cross-sections of the projection data, and also to select the interval between the transverse cross-sections.

In one example of the initial X-ray CT devices, X-ray detectors where used to detect the intensity of X-rays transmitted through the patient in the body axial direction of the patient, and the projection data was collected in one transverse cross-section of the patient. Due to the rapid progress of the technology used in X-ray CT devices, X-ray detectors are arranged in the latest X-ray CT devices in multiple arrays in the body axial direction of the subject and multiple arrays of X-ray detectors are used for simultaneous collection of the projection data in multiple transverse cross-sections of the subject. When these multiple arrays of detectors are used for simultaneous scanning with the helical scanning method, much more projection data can thus be collected than when scanning was conducted with the initial X-ray CT devices. When these multiple detectors are used with the helical scanning method, since transverse cross-sections of the collected projection data will not be present in a dispersed fashion as was the case with the initial X-ray CT devices, virtual transverse cross-section are generally set so that projection data is determined for virtual transverse cross-sections, while interpolation processing is applied to the projection data and image reconstruction operations are conducted by using the projection data of these virtual transverse cross-sections. Because virtual transverse cross-sections of this projection data can be set with a considerable amount of freedom, this makes it possible to select freely the number of pages of the image data obtained with the image reconstruction processing with the consequent setting of virtual transverse cross-sections of projection data, as well as to select the interval between the transverse cross-sections.

During scanning using an X-ray CT device, currently, projection data is collected with X-ray CT scanning devices and image reconstruction processing operations are applied to this projection data with high-speed data processing devices. The result of this image reproduction processing is that multiple obtained transverse cross-section of image data are stored on a storage medium and preserved in magnetic disk devices, optomagnetic disk devices, optical disk devices and the like. The methods used with these results of detection of the X-ray CT devices include burning of images created by using the image data of obtained multiple transverse cross-sections as a result of image reconstruction processing, methods used to observe such a film, observation methods which are used when images are displayed in image observation devices using the image data of multiple transverse cross-sections, image processing involving operations such as three-dimensional image processing performed with image processing devices and applied to the image data of multiple transverse cross-sections obtained as a result of image reconstruction processing, methods used to observe these results, etc.

Although each of these usage methods requires parameters optimized for image reconstruction processing, currently, the data that is stored for a long period of time is image data available after image reconstruction, and since long-term storage of projection data prior to the image reconstruction has not been performed because a major computer resource is required for image reconstruction of projection data, there has been no other research of reconstruction processing using optimized image reconstruction processing parameters with each of the respective usage methods.

In particular, in cases when the structure of three-dimensional processing is created by using the image data of multiple transverse cross-sections, image reconstruction processing parameters suitable for direct observation of transverse cross-section images can be increasingly obtained with results enabling to use image data of multiple transverse cross-sections of reconstructed images with image reconstruction processing parameters that have been optimized for various types of three-dimensional image processing operations. However, because image data is generally preserved for a long period of time only after image reconstruction, and because long-term storage of the projection data has not been provided, it was thus not possible to examine other objectives of image reconstruction processing which are used for each individual operation.

Also, even when long-term storage has been provided, for example of the projection data of X-ray CT devices, since continuous scanning operations with the X-ray CT devices are conducted as a routine with a plurality of scans, it is impossible for an external user to perform image reconstruction by using desirable image reconstruction parameters, which an external user will need for this projection data. Therefore, the image reconstruction of the projection data has been conducted with image reconstruction parameters determined in advance with a routine scan.

There are also types of device enabling to perform high-speed image processing, such as three-dimensional image processing which can be applied to image data obtained with image reconstruction using the latest X-ray CT devices. However, even in a system which is equipped with this function, since continuous scanning operations are conducted routinely with many scans, it is still in fact impossible for an external user to perform three-dimensional image processing with this function.

Because unlike in the initial CT devices, the noise level of the X-ray scanners is decreased while the spatial density of the X-ray scanners is increased in latest multi-array scanners and CT devices which use the helical scan method, and also the pitch density of helical scan is increased, a very precise spatial distribution of the collected projection data is created. Because of that, a very precise image can be obtained with a small increase of the noise level also when the spatial region in which image reconstruction is performed is reduced, while the number of the image elements participating in image reconstruction is preserved. Accordingly, the spatial precision of the images in the region of interest in a given subject can be increased by decreasing the image reconstruction region for the same image projection data. In addition, since a meaningful image can be obtained with only a small increase of the noise level also with a narrow interval between the image reconstruction screens, this also makes it possible to increase the spatial resolution in the body axial direction.

Because a precise spatial distribution of projection data collected with the latest multi-array scanners and CT devices using the helical method has been achieved, CT values (i.e., intensities of the centers of voxels) can now be determined in spatial positions with a small interval not only inside the transverse cross-section of a patient, but also in the body axial direction. In three-dimensional image display devices which use CT image data, voxel data is created from the image data of transverse cross-sections obtained during image reconstruction of projection data accumulated in the body axial direction, and a three-dimensional image is displayed by applying three-dimensional image reconstruction operations to this data. When CT image data obtained with the latest design of multi-array detectors and CT devices using the helical scan method is used, this makes it possible to achieve a very high precision of three-dimensional images.

To create three-dimensional images from CT image data, image reconstruction of projection data obtained with X-ray CT devices is performed, the image data of the transverse cross-sections is created, and voxel data is created when this image data is stacked up in the body axial direction. The image elements in the transverse cross-section, for example 512×512 pixels when an image measurement methods using 0.5 mm ×0.5 mm are applied to image data in the body axial direction, for example with an interval of 0.5 mm, creating a stack of 512 sheets, will contain a spatial region corresponding to 256×256×256 mm and a stereoscopic voxel image will be created with 512×512×512 individual voxel data elements.

Next, when this stereoscopic voxel image is processed with three-dimensional reconstruction processing using surface rendering and volume rendering, a three dimensional image can be created and displayed.

Three-dimensional display devices that have been used up until now perform image reconstruction of projection data obtained with X-ray CT devices and create CT image data. The structure of voxel data is created by using this data. When images containing two-dimensional images of CT images are interpreted by a doctor who is a radiology specialist, a series of CT images displaying a transverse cross-section of a patient is arranged in a plane and the doctor is interpreting the image by observing the image and looking for the presence or absence of abnormalities. On the other hand, to interpret a three-dimensional image, the structure of the voxel data is created from this series of CT image data, a degree of opacity is added to the voxel structure based on the voxel physical properties, that is to say based on the CT values of this voxel data, a light source is applied in the direction of the visual line of an observers who is observing this voxel data and when light emitted from this light source passes through an object, and an image is created with integration of the calculations obtained from attenuation and reflection of this data. Accordingly, because the calculation of integration corresponding to the voxel number of the displayed images will thus be required, the higher the voxel number, the longer the calculation time that will be needed for volume rendering. Specifically, because according to the volume rendering method, each CT value is allocated to the opacity corresponding to light permeation characteristics, and control is maintained over all the voxel values by using light attenuation along the direction of the line of sight based on the variable density calculated with the grey-level gradient method and applied in all the volume points, the brightness value is calculated by multiplying the amount of incident light from a light source by the opacity of the voxel structure. A three-dimensional image is then obtained with sequential integration (recasting) of this data in the direction of the line of sight. Because natural and smooth variations can thus be obtained with the volume rendering method even in edges created by rapid fluctuations of the CT value, this makes it possible to improve dramatically the drawing function which is used to draw fine and detailed tissues, such as the peripheral tissues of blood vessels. Although the surface rendering method represented the main trend of methods used for three-dimensional displaying in the past, the volume rendering method has been used increasingly at present.

With similar three-dimensional display devices used up until now, projection data was collected when a subject was scanned with an X-ray CT device and multiple sheets of CT image data were used with the reconstructed image data containing this projection data. Although the density resolution was often more important than factors such as spatial resolution when CT images were observed as two-dimensional images, the spatial resolution is in some cases more important than the density resolution when three-dimensional images created from CT image data are observed, and when two dimensional images are created from two-dimensional image data, different parameters are often optimal to create the image data structure, when compared to cases when three-dimensional images are observed. However, the current situation is such that CT image data is used for reconstruction with image reconstruction parameters optimized for observation of two-dimensional images containing projection data with X-ray CT devices, and three-dimensional image reconstruction is performed by using CT image data optimized for two-dimensional image observation with three-dimensional image display devices. This is because a major computer resource is required for reconstruction of images from projection data and also a major storage capacity is needed to store accumulated data, etc.

The following points are worth mentioning with respect to X-ray CT devices:

1) X-ray radiation is emitted with the fan shape along the inner plane of a transverse cross-section from a source of X-ray radiation, enabling operations along the outer periphery of the transverse cross-section of a subject, and X-rays transmitted through the subject are measured for example with a detector which measures 500 items. Therefore, for example 500 items can be measured in one position of the radiation source. Projection data is collected when repeated operations are applied to cover 180 degrees of the outer periphery of a transverse cross-section in this manner. For example, since data is collected in more than 180 directions for each repeated operation, projection data corresponding to 500×180=90, 000 will be collected.

2) Convolution processing is conducted after preprocessing and the like has been performed to eliminate noise from the projection data.

3) Data collected in a position corresponding to the transverse cross-section of a subject, for example when a flat surface is set for image elements corresponding to 512× 512 pixels creating a construction of image elements having a rectangular shape covering 1×1 mm, and reversed projection is created with a fan shape for projection data, after convolution processing has been conducted from the position of the source of X-rays, when projection data is collected for each image element on the flat surface containing the image elements.

4) At this point, because data creating a reversed projection will not necessarily be cut laterally in the center of the picture elements of a flat surface of a picture containing the picture elements, interpolation processing is conducted in the vicinity of the reversed projection data and similar data is allocated to each picture elements.

5) When this reversed projection processing is applied repeatedly to all of the collected projection data, each picture element of a picture element flat surface corresponding to 512 picture elements×512 picture elements is used for reconstruction of image data, having a value which corresponds to the physical properties obtained with X-ray irradiation of a subject.

6) If the position of the transverse cross-section of a subject is moved, for example by 1 mm in the body axial direction, the image data of the transverse cross-section is reconstructed by collecting projection data in the same manner and applying image reconstruction processing operations to this data.

7) When these operations are repeated if the position of the transverse cross-section of a subject has been moved in the body direction, image data of transverse cross-sections of a subject corresponding to 500 sheets can be collected for example at an interval of 1 mm. When sets of this data are used, this makes it possible to create a voxel space corresponding to 512×512×500 voxels, creating for example the construction of stereoscopic image elements (voxels) of 1 mm×1 mm×1 mm.

8) Three-dimensional images can be created and displayed when three-dimensional image processing is applied with volume rendering and the like to this voxel space created in this manner.

FIG. 1 is a block diagram showing a simulation of a three-dimensional display device connected to a network with a conventional X-ray CT device. Element 101 is an X-ray CT device, 111 is a scanner part of a CT device, 112 is a data collection part, displayed as a simulation model in the figure. When detection is performed with an X-ray scanning device so that a subject is scanned with a scanner part using X-rays from a source of X-ray radiation, a digitized system of the collected projection data is created in the data collection part. This digitized output data 122 of the X-ray detector is sent to a preprocessing part 113 and operations during which noise is eliminated from the data, correction is applied, etc., are conducted in the part. The projection data 123 preprocessed in this preprocessing part 113 is then sent to an image reconstruction device 114.

Image reconstruction processing is then applied in the image reconstruction device 114 to the projection data 123 once preprocessing operations have been finished. The image data 124 processed with image reconstruction processing is sent to a console part 115 of the X-ray CT device, the data is displayed and at the same time also stored in image data storage device 116. Reference numeral 221 indicates image data which is transmitted to a external three-dimensional image display device or the like.

Reference numeral 201 designates a three-dimensional image display device, 211 is an image data storage device which stores image data transmitted from the X-ray CT device, and 212 is a three-dimensional image processing device. The three-dimensional image processing device is used so that when an operator specifies image data 222, signal is received from the image data storage device 211 and three-dimensional image reconstruction operations involving volume rendering and the like are applied to this signal, and the created three-dimensional image 223 is displayed on a console 213.

As was shown in this example, with conventional three-dimensional image display devices, image data processing in CT applications starts with acquiring projection data (the "raw" data set) from a CT scanning device, then reconstructing sliced digitized image data (a voxel data set) based on the raw data, and then rendering three-dimensional images on a computer display screen based on the voxel data set. The rendering processing is always based on the voxel data set which is reconstructed once and stored on disk or other storage device. In other words, the rendering processing did not utilize the projection data set, because reconstruction was very time consuming, so it was not practical to use the projection data for rendering.

During scanning operations using an X-ray CT device, projection data is collected with an X-ray CT device, image reconstruction processing is applied with a high-speed data processing device to this projection data, and image data comprising multiple transverse cross-sections obtained as a result of this processing is stored in a magnetic disk device, electromagnetic disk device, optical disk device or the like. While suitable parameters exist for image reconstruction processing according to respective methods using results that have been detected with an X-ray CT device, prior to the present invention, since long-term storage is not provided for projection data if image data exists for image data that has been stored after image reconstruction processing operations, image reconstruction processing has not been realized with parameters that have been optimized for image reconstruction processing according to each respective method.

In particular, when the construction of three-dimensional data is created by using the image data of multiple transverse cross-sections, the image reconstruction processing parameters that are compatible with direct observation of images of transverse cross-sections are different from image reconstruction processing parameters that are compatible with processing of three-dimensional images in an increasing number of cases, when it would be desirable to used the image data obtained during image reconstruction. However, image reconstruction processing is generally not conducted for this specific purpose because a major storage capacity is needed in order to accumulate projection data. Further, when long-term storage of projection data is not performed, since most of the time is spent on routine processing performed by image reconstruction devices of X-ray CT devices, the development is not open to users outside of the system. Therefore, the image reconstruction devices thus cannot be used even if reconstruction of projection data is desirable for three-dimensional images because a major computer resource is needed for reconstruction of images using projection data.

SUMMARY OF THE INVENTION

The present invention includes a method which includes accessing projection data collected by a medical imaging system during a scan of a body, and using the projection data directly to render an image of a region of interest of the body. The invention further includes an apparatus to perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
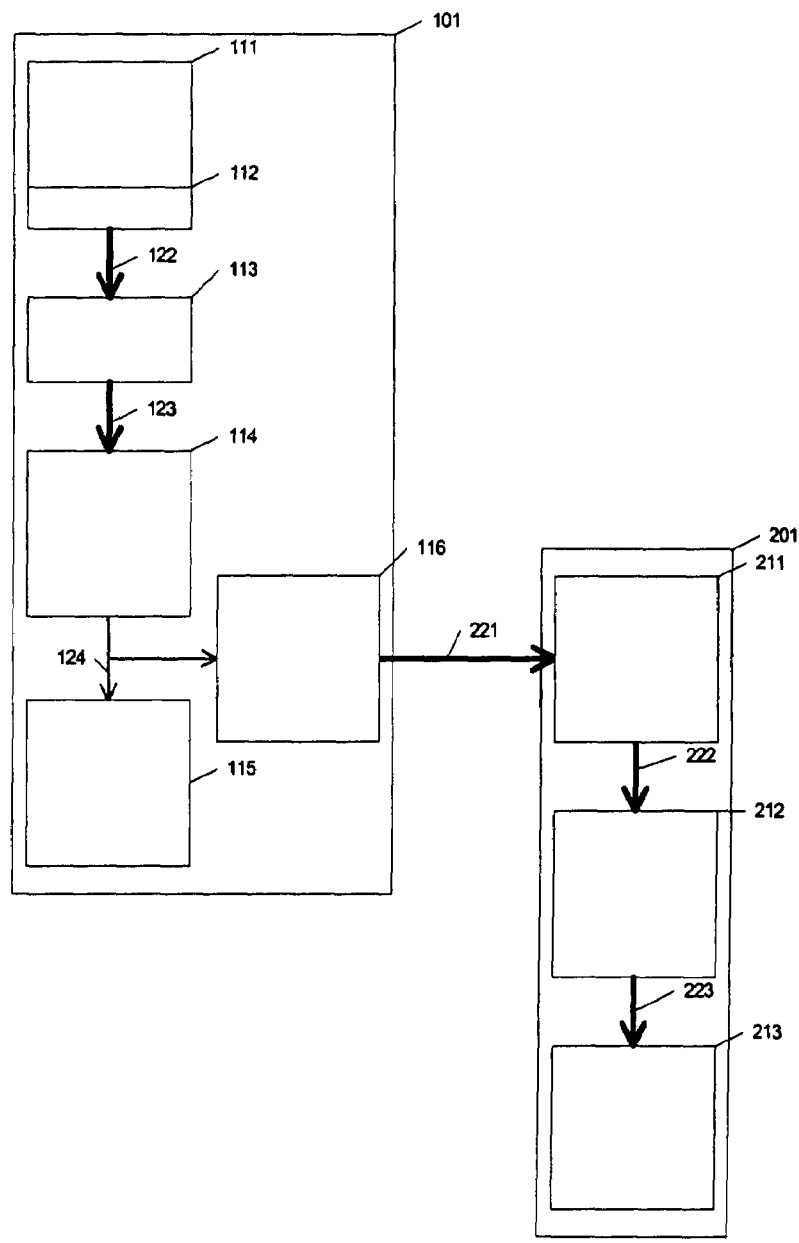
FIG. 1 is a block diagram showing a simulation of a three-dimensional display device connected to a network with a conventional X-ray CT device.

A method and apparatus for creating three-dimensional images directly from projection data are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

In order to solve the problem mentioned above, the present invention includes a three-dimensional image display device which makes it possible to create and display three-dimensional images directly from projection data. In certain embodiments of the invention, the image display device is equipped with a mechanism for accumulation of projection data collected during X-ray scanning, connected to an X-ray CT device, and with a mechanism for displaying of created three-dimensional images using this projection data, without using slice or volume image data obtained during image reconstruction processing with an X-ray CT device. In this three-dimensional image display device is deployed a mechanism setting spatial regions that are of interest for displaying of three-dimensional images, that is to say spatial regions in which three-dimensional images are created with three-dimensional image reconstruction; and a mechanism setting in advance the spatial position and the spatial distribution of a plurality of points used to determine the physical amount, that is to say the CT values, of the characteristics of a subject used for reconstruction of three-dimensional images. Reconstruction processing is then conducted by using the projection data in the spatial positions determined within these specified spatial regions of interest, and the CT values of the subject are obtained. Reconstruction processing operations of three-dimensional images are applied to a data set containing the CT values obtained in this manner and the obtained results are displayed as three-dimensional images.

When three-dimensional images were created and displayed according to the prior art, images were reconstructed with slice data in different cross-sectional positions from the projection data of an X-ray CT device, and three-dimensional voxel data was created by stacking up slice data in these different cross-sectional positions. Volume rendering processing operations and similar processing operations were then applied to this three-dimensional voxel data to create and display three-dimensional images. In contrast to that, the three-dimensional image display device of the present invention is equipped with a mechanism to set spatial regions of interest in which reconstruction of three-dimensional images is conducted, that is to say spatial regions of interest for displaying of three-dimensional images, and with a mechanism setting in advance the spatial position and the spatial distribution of points determining the physical properties, that is to say the CT values, of a subject used for reconstruction of three-dimensional images. Reconstruction processing is then conducted by using the projection data in the spatial positions specified within these specified spatial regions of interest, displaying the physical amounts, i.e., the CT values, of the characteristics of the subject. Because of that, reconstruction processing of three-dimensional images is applied to data sets with CT values inside these regions of spatial interest obtained in this manner and the obtained results are displayed as three-dimensional images.

In addition, taking into account regions of spatial interest determining the data sets with physical amounts displaying the characteristics of a subjects, e.g., the CT values, and the spatial positions and the spatial distribution of a plurality of points determining the CT values, as well as the influence exerted by this on the image quality of three-dimensional images obtained by reconstructing three-dimensional images using the data sets containing these CT values; the device is equipped with a mechanism to enable the determination of spatial regions of interest determining a data set of CT values by performing image reconstruction of projection data, as well as to determine the spatial position and the spatial distribution of a plurality of points determining the CT values when image reconstruction operations are conducted with projection data.

Whereas according to prior art projection data was applied to the entire region in which projection data was present and this projection data was then used when image reconstruction processing operations were conducted with X-ray CT devices, with the three-dimensional display device of this invention, a spatial region of interest in which three-dimensional images are to be created is set in advance, and image reconstruction operations are applied only inside this region of spatial interest. In addition, while the dimensions and the number of the image elements in image planes used for image reconstruction were determined in advance with X-ray CT devices according to prior art, and image reconstruction operations were applied to the central point of these image elements, with the three-dimensional display device according to this invention, the spatial position and the spatial distribution of multiple points determining the CT values from the viewpoint of the image quality of three-dimensional images to be created are determined in advance and image reconstruction operations are conducted by using projection data in these points. Moreover, because a fine point distribution is created in regions exerting a major influence on the image quality of three-dimensional images, this makes it possible to greatly reduce the amount of calculations required for image reconstruction, so that the point distribution will be sparse or there will be no distribution in spatial areas which will have only a small influence on the image quality of three-dimensional images.

Since this makes possible to greatly reduce the amount of calculations that are required for processing of three-dimensional images, image reconstruction processing can be performed from projection data every time when a three-dimensional image is created, and the result can be used to created three-dimensional images.

Because during ray tracing operations using volume rendering, ray-tracing operations are conducted within a range having a conical shape inside a spatial regions occupied by a subject from the viewpoint of the region of interest which is irradiated with the rays, volume rendering can be conducted by applying the CT values to the rays used during the processing of the ray tracing operations. Accordingly, when the rays to be used for ray tracing operations of volume rendering are determined in advance, this makes it possible to use only points on the rays which are used for ray tracing for the reconstruction of images from the projection data. Also, because attenuation of light is performed according to the opacity of the subject during the ray tracing operations, the spatial region contributing to ray tracing operations is limited to the depth direction of the rays. Moreover, lateral opacity can be set to 0 and ignored also from the viewpoint of the region of interest for the rays. Accordingly, reconstruction of images from the projection data can be performed only in the spatial regions which contribute to ray tracing operations. In other words, because according to this invention, certain points are set for rays, wherein the rays are crossing the regions of spatial interest, image reconstruction operations are processed by using set of projection data in the vicinity of these points, and the results of these image reconstruction operations are used for volume rendering with the CTV values of the rays obtained in this manner.

Because the region of interest in a three-dimensional display is normally quite small when compared to spatial regions obtained with X-ray CT projection data, the amount of calculations can be greatly reduced when this invention is used. This makes it possible to perform processing of image reconstruction operations with optimized data, which is determined for each instance when processing of three-dimensional images is conducted.

During image reconstruction operations performed with an X-ray CT device, image reconstruction regions are set which are smaller than the regions obtained with projection data, and the processing operations are performed so that the image data is obtained with smaller dimensions of image elements used for image reconstruction processing in the reconstructed regions. According to the characteristics of this invention, the density of points creating the CT values of rays, and the density in the direction of the rays and of the regions in which ray tracing is applied with volume tracing, is determined in advance from the viewpoint of volume rendering. Image reconstruction processing from projection data is performed based on the spatial position and spatial distribution of multiple points which are determined by the number of rays cast and the number of sample points along each ray taking into account volume rendering processing at later stage. The image reconstruction operations are thus characterized by the fact that projection data which passes through these points and through the vicinity of this data are reconstructed.

According to conventional methods, interpolation processing operations were conducted several times during the processing of three-dimensional reconstructed images and during image reconstruction processing of projection data:

(1) When image reconstruction processing was conducted based on the projection data of a helical scanner, interpolation processing was applied to the projection data of a helical scanner to determine the projection data passing through a transverse cross-section of a reconstructed image;

(2) During the processing of image reconstruction operations, interpolation processing was applied to the projection data established in (1) in order to determine the projection data passing through image elements of an image plane; and (3) As the image data of reconstructed cross-sections was stacked up in the direction of the bodily axis to create the structure of voxel data used during the three-dimensional processing, interpolation processing was conducted before and after the profile image data is used to obtain the desired interval in the axial direction; and (4) Interpolation processing was applied to voxel data to determine the CT values of rays with ray casting during volume rendering.

According to embodiments of this invention, the points corresponding to the CT value are determined in advance as an important value for ray casting of volume rendering operations, and image reconstruction is conducted so that interpolation processing is applied to the projection data passing through the vicinity of these points. Ray casting processing is therefore applied to volume processing by using this determined CT value. Accordingly, since interpolation processing can be performed so that data interpolation processing is conducted only once for projection data passing through this vicinity, this makes possible to greatly reduce the number of times when interpolation processing is required, while the image quality can be also greatly improved when compared to methods which are used currently to create three-dimensional images.

The method of this invention enables to significant reduction in the amount of calculations used for data processing. In particular:

(1) Because the points of spatial regions in which image reconstruction is to be conducted can be determined in advance, this made it possible to greatly reduce the amount of calculations which are used for data processing.

(2) Since the number of times when interpolation of data is conducted can be reduced, this made it possible to greatly reduce the amount of calculations which are used for image reconstruction processing and for image reconstruction operations during processing of three-dimensional images. Also, when the number of incidences of data interpolation processing is reduced, the quality of the image is also greatly improved.

(3) Because conditions for image reconstruction processing are created so that data is created in advance for points which are important for ray casting processing of volume rendering operations, the amount of calculations which are used for processing with reconstruction of three-dimensional images is greatly reduced.

Because of that:

(1) Since the amount of calculations which are used for data processing has been greatly reduced, this enabled direct creation of three-dimensional images for projection data, which is something that was not possible according to routines available up until now.

(2) Based on the premise that three-dimensional images can be created, an optimized pattern can be created for reconstruction of three-dimensional images with the image reconstruction parameters of projection data.

(3) Since the amount of calculations used for data processing has been reduced, reconstruction of images can be performed with a narrower interval when compared to prior art, which makes it possible to further improve the image quality of three-dimensional images.

According to embodiments of this invention, spatial coordinates are determined in advance for points within a spatial region which is used for calculation of volume rendering and in spatial regions of the volume data used with volume rendering, and CT values are determined with image reconstruction processing which is applied in the position of spatial coordinates of each point present during image reconstruction processing which uses projection data. Next, during processing of volume rendering when a three-dimensional image is created, volume rendering is conducted by using the CT values determined during image reconstruction processing applied to the spatial coordinate positions of each of these points. From the viewpoint of the situation existing when a three-dimensional image is created, because the spatial region of the volume data which is used during volume rendering is only one part of the total volume data, the spatial regions in which reconstruction of the projection data is conducted can thus be greatly reduced, and this in turn makes it possible to cut down considerably on the amount of computer resources which are required for reconstruction of images. At the same time, also the time required for calculations which are need for reconstruction of images can be reduced in this manner by a great margin. In addition, because CT values are determined in advance with image reconstruction processing for the points that are required for volume rendering, interpolation processing of voxel values that were needed with conventional volume rendering operations is no longer required. The time required for calculations during three-dimensional image reconstruction is therefore reduced and deterioration of the precision accompanying interpolation is prevented, which makes it possible to improve the image quality.

Figure 2:
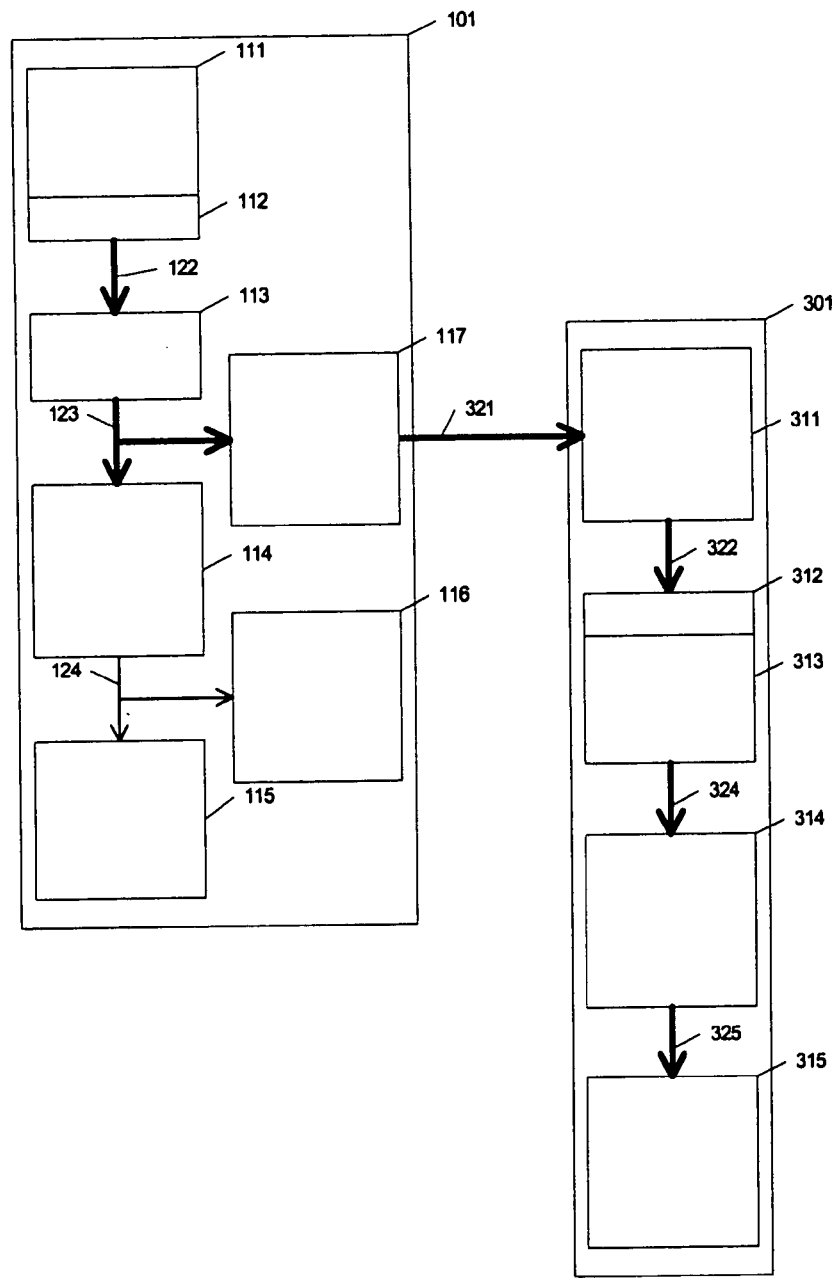
FIG. 2 is a block diagram showing a model of a three-dimensional image display device according to an embodiment of the present invention, which is connected through a network to an X-ray CT device.

The following is an explanation of a system of a three-dimensional display device creating three-dimensional images directly from the projection data of an X-ray CT device according to an embodiment of this invention. FIG. 2 is a block diagram showing a model of a three-dimensional image display device according to an embodiment of this invention, which is connected through a network to an X-ray CT device.

Element 101 designates an X-ray CT device, 111 is a scanner part of the X-ray CT device, and 112 designates a data collecting part. Projection data acquired when X-ray scanning of a subject is performed with the scanner part of an X-ray scanner is detected and digitized in a data acquisition part. The digitized output data 122 of the X-ray detector is sent to a preprocessing part 113 and preprocessing, such as noise elimination and standardization, is conducted in this part. Projection data 123, which has been preprocessed in the preprocessing part 113, is sent to an image reconstruction device 114 and at the same time, it is also sent to a projection data storage device 117 where it is stored. Image reconstruction processing operations are then applied by the image reconstruction device 114 to the projection data 123 when preprocessing is finished. Reconstructed image data 124 is sent to a console 115 and displayed, and at the same time also stored in an image data storage device 116. Number 321 indicates projection data which is transmitted from the data storage device 117 to a three-dimensional display device. Because the X-ray CT device in some cases will not have this projection data storage unit 117, the data 123 will be in such a case preprocessed with the preprocessing part 113 and sent directly to a three-dimensional image display device and stored.

Element 301 designates a three-dimensional display device, and 311 is a data storage device which stores projection data 321 which has been sent from an X-ray CT device. Number 312 indicates the setting of a spatial region for image reconstruction based on a spatial region of interest for creation of three-dimensional images, having a function which sets image reconstruction regions. This functionality can be physically implemented in the image reconstruction processing device 313. The image reconstruction processing device 313 requests image reconstruction processing of CT values in points specified within a specified region for image reconstruction. Reference numeral 324 represents a data set of CT values used for image reconstruction, which is sent to the three-dimensional image processing device 314. A three-dimensional image processing device 314 receives the signal containing the data set 324 with the CT values used for image reconstructions from the three-dimensional image processing device 313, three-dimensional image reconstruction processing is applied to this data with volume rendering and the like, and the created three-dimensional image data 315 is displayed on a console 315.

Figure 3:
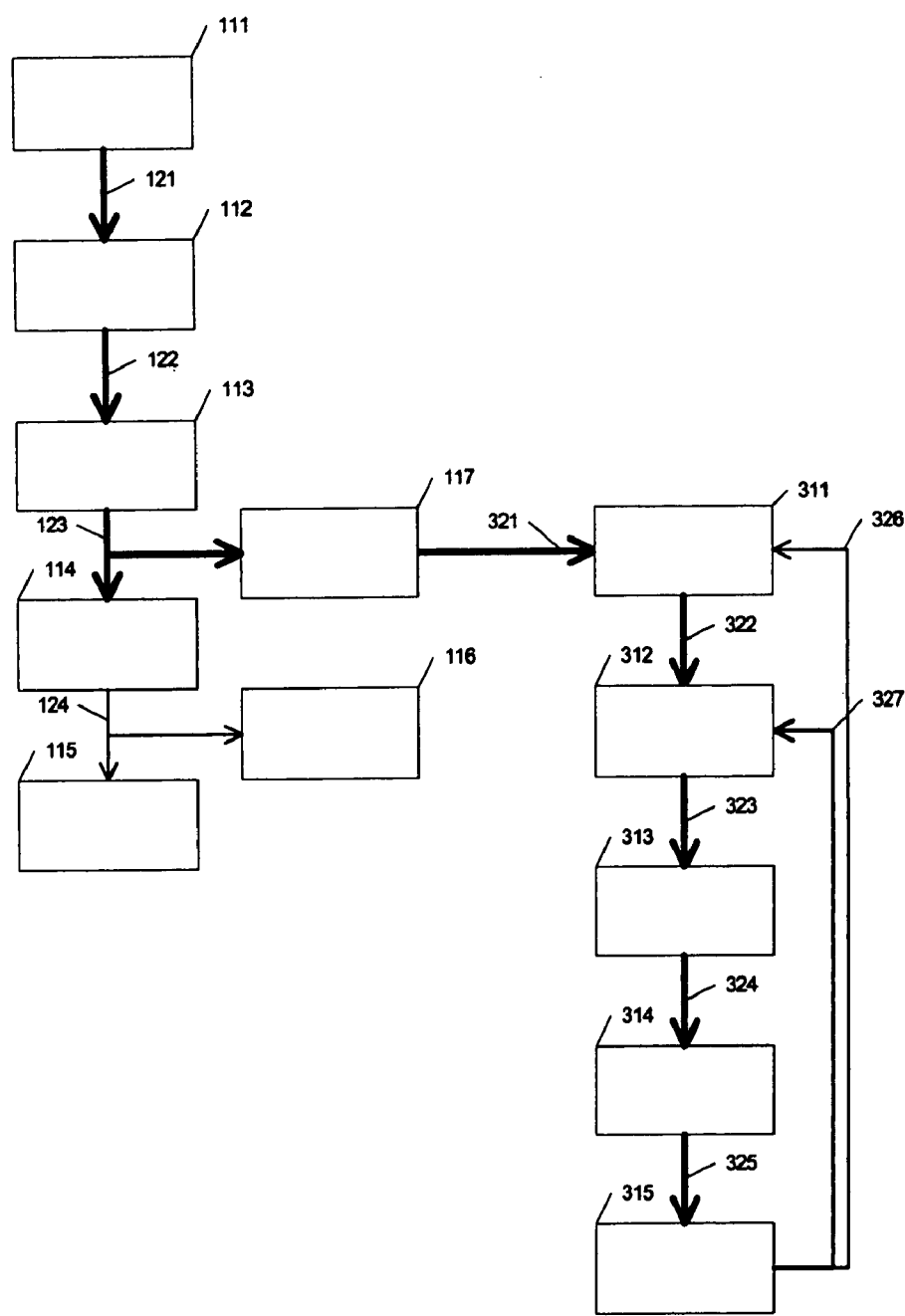
FIG. 3 is a diagram simulating the processing and the flow of data occurring in a three-dimensional device according to an embodiment of the present invention.

FIG. 3 is a diagram simulating the processing and the flow of data occurring in a three-dimensional device. When X-rays 121 are transmitted through a subject with X-ray scanning by a scanner part 111 of an X-ray CT device, these X-rays 121 are detected with an X-ray detector and digitized data is created in a data acquisition part 112. This digitized projection data 122 is sent to the preprocessing part 113 and processing such as noise elimination or correction and the like is applied to this data in this part. The projection data 123, which has been preprocessed in the preprocessing part 113, is sent to the image reconstruction part 114, and at the same time, it is also sent to the image data storage device 117 where it is stored. When preprocessing is finished, image reconstruction processing operations are applied with the image reconstruction device 114 to the image projection data 123. The reconstruction image data 124 is sent to and displayed on the console 115 of the X-ray CT device, and at the same time also stored in an image data storage device 116. Number 321 indicates projection data which is sent from the data storage device 117 to a three-dimensional display device.

A projection data storage device 331 of the three-dimensional display device stores projection data 321, which has been transmitted from the X-ray CT device, and scan projection data 322, specified by an operator, is sent to a reconstruction region setting part 312 of an image reconstruction processing device. Based on the position of the points in the spatial regions in which image reconstruction is performed, requested from spatial regions for creation of three-dimensional images by the reconstruction region setting part 312, image reconstruction parameters are set and the required projection data 323 is prepared. During image reconstruction processing 313, image reconstruction processing is determined with the CT values of points specified within a specified image reconstruction spatial region. Three dimensional image processing 314 is applied to a data set 324 containing the CT values for image reconstruction. Three-dimensional image processing 314 is used to perform reconstruction of three-dimensional images, including volume rendering and the like, and the created three-dimensional images 325 are displayed by a console 315.

When an operator selects scanning of three-dimensional images to be created, instruction 326 is transmitted which specifies the required projection data for the projection data storage device from the console. Based on this instruction, scan projection data 322, specified by an operator, is sent by the projection data storage device to the reconstruction region setting part 312 of the image reconstruction processing device.

When an operator determines a spatial region of interest for a three-dimensional image to be created by using the projection data, the spatial distribution and the spatial position of points determining the CT values are set, and instruction 327 is sent from a console to the reconstruction region setting part. Based on this instruction, the reconstruction region setting part 312 sets the image reconstruction parameters and prepares the required projection data 323. During image reconstruction processing 313, the CT values of points that have been specified within an image reconstruction region are determined with image reconstruction processing. Three-dimensional image processing 314 is then performed by using data set 324 with the CT values determined during the image reconstruction. Three-dimensional processing 314 is then performed to achieve three-dimensional image reconstruction with operations such as volume rendering and the like, which are applied to the data which has these CT values, and the created three-dimensional image 325 is displayed on the console 315.

When an operator observes a three-dimensional image, the parameters or the regions in which three-dimensional images are to be created can be modified as required by the operator when an instruction 327 is sent from the console. Using updated parameters for image reconstruction, reconstruction operations are performed for reconstruction of images and for reconstruction of three-dimensional images. Because according to this invention, the time required for reconstruction of images has been greatly reduced, the processing of this series of scans can be conducted in an interactive manner.

Figure 4:
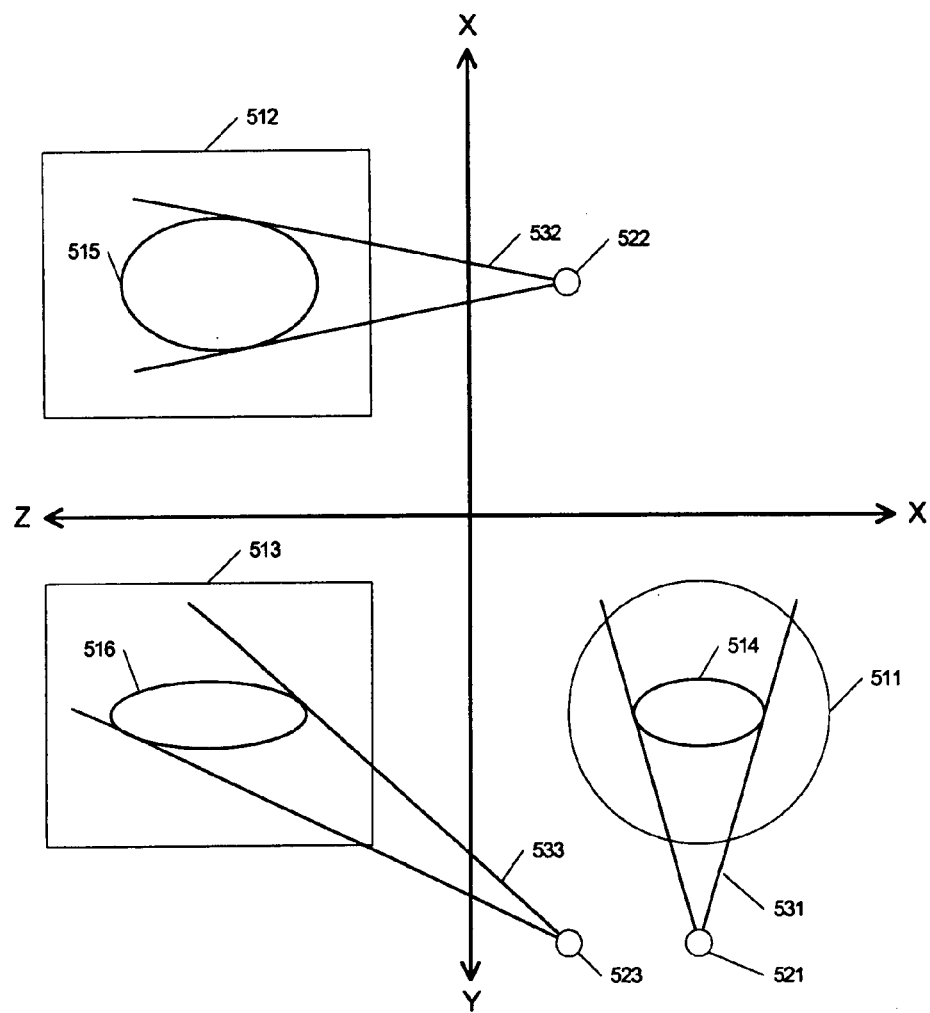
FIG. 4 is a diagram explaining in a simulated form the relationships in the spatial regions of the present invention.

FIG. 4 is a diagram explaining in a simulated form the relationships in the spatial regions of this invention. Reference numerals 511, 512, 513 indicate respective planes of the spatial regions in which projection data of a subject is collected, namely plane X-Y, plane X-Z, and plane Y-Z. Reference numerals 514, 515, 516 indicate respective planes of the regions of interest for formation of a three-dimensional images, namely plane X-Y, plane X-Z, and plane Y-Z. Reference numerals 521, 522, 523 indicate the planes of the position of the viewpoint in which a three-dimensional image is created, namely plane X-Y, plane X-Z, and plane Y-Z. Reference numerals 531, 532, 533 indicate the planes of the spatial regions of the rays used during ray tracing processing when a three-dimensional image is created, namely plan X-Y, plane X-Z and plane Y-Z.

The projection data of spatial regions indicated by 511, 512, 513 is collected with scans of the X-ray CT device. This projection data is transferred according to this invention to a three-dimensional image display device. An operator determines the spatial regions for creation of three-dimensional images, that is to say spatial regions of interest 514, 515, 516. After that, the viewpoint positions 521, 522, 523 are set. Numbers 531, 532, 533 indicate plane X-Y, plane X-Z and plane Y-Z, which have a conical shape and which include the line of sight when a region of interest is seen from said viewpoint. The rays used during the ray tracing operations create three-dimensional images including the inner part of these spatial regions. Taking into account the image quality of the three-dimensional images, when the ray density is set with a radial shape which is extending from said viewpoint inside this conical region, the position of the point determining the CT value is set on the line of each of these rays. In other words, the position of the point determining the CT value is set on the line of the rays which are used for ray tracing operations.

The positions of the points determining the CT values are thus indicated with the reconstruction region setting part. The image reconstruction device uses projection data passing through the points determining the CT values and through the vicinity of these points according to this indication and the CT values of the indicated points determining the CT values are determined. The three-dimensional image processing device performs three-dimensional processing by using the data set containing the CT values of the determined points with the indicated CT values. Interpolation processing is therefore not necessary because the CT values of the points on the line of the rays are determined by using ray tracing operations for processing of three-dimensional images.

While in the example explained above, projection data was transferred through a network from an X-ray CT device to a three-dimensional display device, embodiments of the invention may include transfer of projection data from an X-ray CT device to a three-dimensional image device off line, through a storage medium, in the same manner.

Although in the apparatus explained up until now, an X-ray CT device was separate from the three-dimensional display device, in certain embodiments of the invention the function of three-dimensional image display device is included in an X-ray CT device.

While it was explained up until now that the perspective projection method was used for processing of volume rendering operations, in certain embodiments of the invention the parallel processing method or another method can be also included in the same manner in the processing of volume rendering operations.

Although the three-dimensional processing explained up until now related to volume rendering processing, this invention can be also used with MIP, ray sum processing and other types of processing used for three dimensional processing operations. It is further also possible to use displaying of two-dimensional cross-sections, displaying of two-dimensional images of curved cross-sections and other types of processing of two-dimensional images.

Although an X-ray CT device was used as an example in the described provided up until now, this invention also includes cases when line data such as data obtained from an ultrasonic device is stored, when data is generated by so called MR equipment or when data is generated by so called nuclear medicine apparatuses using SPECT or the like without the projection data of an X-ray CT device, as well as systems in which image reconstruction is conducted with optimal new parameters applied as required.

With conventional devices for displaying and creating three-dimensional images, profile data was created when image reconstruction was applied to projection data with X-ray CT devices. Next, three-dimensional voxel data was created by stacking up slice data in different positions of the cross-sections. Three-dimensional image reconstruction processing was then applied with volume rendering and similar operations to this three-dimensional voxel data and three-dimensional images were created and displayed.

In contrast to that, the three-dimensional display device of this invention is provided with a mechanism to set regions of spatial interest, i.e., regions of spatial interest in which three-dimensional image reconstruction operations are conducted to display a three-dimensional image; and with a mechanism setting in advance the spatial position and the spatial distribution of points determining the physical amounts, i.e., the CT values, indicating the characteristics of a subject used for reconstruction of three-dimensional images.

Reconstruction processing is conducted by using projection data in the spatial positions which have been specified within the regions of spatial interest determining the physical amounts, i.e., the CT values, indicating the characteristics of the subject. Therefore, the results obtained with reconstruction processing of three-dimensional images applied to the data cats with the obtained CT values are displayed as three-dimensional images.

Also, because the data sets containing the physical amounts, i.e., the CT values indicating the characteristics of a subject, are spatially distributed in the present spatial regions with the points in which CT values are present, taking into account the influence exerted in the image quality of the three-dimensional images obtained with the reconstruction processing operations for three-dimensional reconstruction using these data sets, the invention is provided with a mechanism which makes it possible to determine regions of spatial interest determining CT values with reconstruction of images using projection data, as well as the spatial position and the spatial distribution of multiple points determining the CT values within a regions of interest.

According to conventional X-ray CT devices, image reconstruction operations were conducted by using the projection data in all the regions in which projection data was present. According to the three-dimensional device of this invention, regions in which three-dimensional images are to be created are set in advance and image reconstruction operations are conducted only in these regions. In addition, although with X-ray CT devices according to prior art, the dimensions and the number of image elements used for image reconstruction were determined in advance and image reconstruction operations were applied to the central point of these image elements, according to the three-dimensional display device of this invention, the positions and the distribution of points having the CT value are planned in advance from the viewpoint of the image quality of the three-dimensional image to be created, and image reconstruction processing is conducted by using projection data so that it is applied in these points. Because of that, image reconstruction processing operations have thus become unnecessary in parts containing regions that have no relationship to creation of three-dimensional images. Moreover, because the points in parts which exert a major influence on the image quality of three-dimensional images are distributed with precision also in the spatial regions in which three-dimensional images are created, while in parts which exert small influence on the image quality of three-dimensional images, the points are distributed sparsely or there is no distribution of such points, this made it possible to greatly reduce the amount of calculations required for image reconstruction. Because the amount of calculations involved in image reconstruction has thus been greatly reduced, every time a three-dimensional image is created, image reconstruction operations can be conducted from projection data, and three-dimensional images can be created from the results of these operations.

Because during ray tracing processing using volume rendering, ray tracing is conducted in a range which has a conical shape, in which radiation is applied to regions of interest of a subject from the viewpoint of a spatial region which is occupied by a subject, volume rendering can be conducted when CT values have been applied to these rays using processing of these ray tracing operations. Accordingly, because the rays to be used for ray tracing with volume rendering are determined, the processing can be conducted only in the points of these rays by using ray tracing when image reconstruction is conducted from this projection data. Further, because the light is attenuated by the degree of opacity of the object during ray tracing processing, the spatial regions contributing to ray tracing are limited only to the direction of the depth of the rays. Further, lateral opacity, namely on the side of the regions of interest for the rays, can be set to zero and ignored. Accordingly, image reconstruction operations from the projection data can thus be conducted only in spatial regions which contribute to ray tracing processing. In other words, image reconstruction processing operations are conducted by using sets of projections data passing through the vicinity of these points in points set on rays intersecting other rays in the regions of interest of a subject, and the CT value of rays obtained as a result of this processing of image reconstruction are used to perform volume rendering. Because the regions of interest in a three-dimensional image display are normally smaller when compared to regions of interest obtained with the acquisition of X-ray CT projection data, the method of this invention makes it possible to realize image reconstruction operations which use projection data each time for processing and displaying of three-dimensional images.

Also, when image reconstruction is conducted with an X-ray device, regions that are smaller than regions in which projection data is acquired are set, and image processing operations are applied to these regions. According to this invention, the density in the direction of the rays and the regions in which ray tracing processing is performed for volume rendering are set in advance, the density contributing to the CT values on the rays is determined from the viewpoint of the contribution to the volume rendering, and the positions of the points in which CT values are determined and the spatial regions in which image operations are conducted are determined, so that image reconstruction processing operations are conducted by using projection data passing through the vicinity of these points.

According to the characteristics of a second embodiment of this invention, regions in which ray tracing processing of volume rendering is conducted and the density in the direction of the rays are determined in advance, the density contributing to CT values of the rays is determined from the viewpoint of the contribution to volume rendering, the spatial regions in which image reconstruction operations are conducted are determined by this, the participating voxel values are determined, and image reconstruction operations are conducted by using the projection data passing through the vicinity of this voxel data.

According to the method of this invention, the points in which CT values are required for ray casting processing applied to volume rendering are determined in advance, image reconstruction operations are performed with interpolation processing applied to projection data passing through the vicinity of these points and the CT values are determined. The data sets containing the CT values obtained in this manner are used to perform ray tracing processing of volume rendering. Therefore, because data interpolation processing can thus be conducted only once, this makes it possible to greatly reduce the number of times when interpolation processing is conducted, which is also accompanied by a greatly improved image quality.

The method of this invention made it possible to greatly reduce the amount of calculations which are required for processing of data. (1) Because the points and the spatial regions in which image reconstruction operations are performed are determined ahead of time, this made it possible to greatly reduce the amount of calculations which are required for processing of image reconstruction operations. (2) Because the number of times when data interpolation processing can be conducted has been greatly reduced, the amount of calculations required for processing of image reconstruction operations and for processing of reconstruction of three-dimensional images has been greatly reduced. This also made it possible to improve the image quality because the number of times when data interpolation processing is conducted has been reduced. (3) Since the data of CT values is determined in advance for positions important for processing of ray tracing operations with volume rendering and made available for processing of image reconstruction operations, this made it possible to greatly reduce the amount of calculations which are required for processing during reconstruction of three-dimensional images.

Therefore, since the amount of calculations required for data processing has been reduced as described in (1) above, this made it possible to create three-dimensional images directly from projection data, which has not been possible with routines that are currently used. Since creation of three-dimensional images is based on the premise described in (2) above, this made it possible to use parameters that are optimized for three-dimensional images with image reconstruction parameters of projection data. And since the amount of calculations has been reduced as described in (3) above, image reconstruction operations can thus be performed with a narrower interval than according to prior art, which in turn made it possible to improve the image quality of three-dimensional images.

According to this invention, the spatial coordinates of points in spatial regions used for calculation of volume rendering and spatial regions of data used during volume rendering are determined in advance, and CT values of points used for image reconstruction operations are determined and applied to positions of spatial coordinates in respective points for image reconstruction processing using projection data. Next, during processing of volume rendering to create three-dimensional images, volume rendering is conducted by using CT value determined during image reconstruction processing applied to respective points in the positions of the spatial coordinates. Because the spatial region containing data used with volume rendering is one part of the spatial region representing all of the projection data, this makes it possible to greatly reduce the spatial regions in which reconstruction processing is conducted with projection data, which in turn makes it possible to greatly reduce in this manner the amount of calculations which are required for image reconstruction. At the same time, the calculation time required for image reconstruction processing is also greatly reduced. In addition, because CT values of points required for calculation of volume rendering are determined in advance with image reconstruction processing operations, interpolation processing between the voxel units, which was required with volume rendering according to prior art, is no longer necessary, enabling to decrease the calculation time, as well as to prevent deterioration of the precisions which accompanies interpolation, and making it possible to greatly improve the image quality.

Thus, a method and apparatus for creating three-dimensional images directly from projection data have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   determining a region of interest of a body in relation to a CT scan;
   selecting a set of sample points within the region of interest based on expected contributions of said sample points to a subsequent volume rendering process;
   using the projection data to generate CT values for the sample points; and
   applying said volume rendering process to the CT values to create a three-dimensional image.

2. A method as recited in claim 1, wherein selecting the set of sample points comprises:
   selecting the sample points so that the density of the sample points in a particular subset of the region of interest corresponds to a degree to which the subset of the region will affect the quality of the three-dimensional image.

3. A method as recited in claim 2, wherein selecting the set of sample points comprises:
   selecting sample points so that sample points are distributed more densely in a first subset of the region of interest than in a second subset of the region of interest when the first subset of the region of interest has a greater influence on the quality of the three-dimensional image than the second subset of the region of interest.

4. A method as recited in claim 3, wherein applying the volume rendering process comprises using a ray casting process, and wherein selecting a set of sample points within the region of interest comprises selecting a set of sample points within the region of interest, based on expected contributions of said sample points to said ray casting process.

5. A method as recited in claim 4, wherein said ray casting process comprises defining a plurality of rays through the region of interest; and
   the method further comprises:
   limiting the set of sample points to a depth direction of the rays.

6. A method as recited in claim 4, wherein said ray casting process comprises defining a plurality of rays through the region of interest;
   and wherein said method further comprises:
   not performing reconstruction or rendering for any sample point located beyond another sample point that has an opacity of 1.0 in a direction of said rays.

7. A method as recited in claim 1, wherein:
   applying the volume rendering process comprises using a ray casting process which includes defining a plurality of rays through the region of interest;
   selecting a set of sample points within the region of interest comprises selecting a set of sample points within the region of interest, based on expected contributions of said sample points to said ray casting process; and
   the method further comprises:
   limiting the set of sample points to a depth direction of the rays.

8. A method as recited in claim 1, wherein the method comprises:
   determining a direction for a plurality of rays through said region of interest;
   determining a density of the rays; and
   determining a distribution of said sample points along the rays.

9. A method as recited in claim 1, wherein the projection data is X-ray projection data.

10. A system to generate three-dimensional images of features of a body, the system comprising:
    a machine-readable storage facility to store projection data collected by CT scanning of a body;
    an image reconstruction processing device to identify a three-dimensional region of interest in the body, to select a plurality of samples points within the region of interest based on expected contributions of the sample points to a subsequent volume rendering process, and to use the projection data to generate a set of CT values for the sample points; and
    a three-dimensional image processing device to generate a three-dimensional image of the region of interest, based on the CT values.

11. A system as recited in claim 10, wherein selecting the set of sample points comprises:
    selecting the sample points so that the density of the sample points in a particular subset of the region of interest corresponds to a degree to which the subset of the region will affect the quality of the three-dimensional image.

12. A system as recited in claim 11, wherein selecting the set of sample points comprises:
    selecting sample points so that sample points are distributed more densely in a first subset of the region of interest than in a second subset of the region of interest when the first subset of the region of interest has a greater influence on the quality of the three-dimensional image than the second subset of the region of interest.

13. A system as recited in claim 10, wherein applying the volume rendering process comprises using a ray casting process, and wherein selecting a set of sample points within the region of interest comprises selecting a set of sample points within the region of interest, based on expected contributions of said sample points to said ray casting process.

14. A system as recited in claim 13, wherein said ray casting process comprises defining a plurality of rays through the region of interest; and the image reconstruction processing device further is to limit the set of sample points to a depth direction of the rays.

15. A system as recited in claim 13, wherein said ray casting process comprises defining a plurality of rays through the region of interest; and wherein the volume rendering process comprises:

not performing reconstruction for any sample point located beyond another sample point that has an opacity of 1.0 in a direction of said rays.

16. A system as recited in claim 10, wherein:

applying the volume rendering process comprises using a ray casting process which includes defining a plurality of rays through the region of interest;

selecting a set of sample points within the region of interest comprises selecting a set of sample points within the region of interest, based on expected contributions of said sample points to said ray casting process; and the method further comprises:

limiting the set of sample points to a depth direction of the rays.

17. A system as recited in claim 10, wherein the image reconstruction processing device further is to:

determine a direction for a plurality of rays through said region of interest;

determine a density of the rays; and determine a distribution of said sample points along the rays.

18. An imaging device to create three-dimensional images, the device comprising:

means for connecting with an X-ray CT device equipped with a mechanism to collect projection data by X-ray scanning;

means for storing the projection data;

means for determining a region of interest;

means for selecting a set of sample points within the region of interest based on expected contributions of said sample points to a subsequent volume rendering process;

means for using the projection data to generate CT values for the sample points; and means for applying said volume rendering process to the CT values to create a three-dimensional image.

19. An imaging device as recited in claim 18, wherein the means for selecting the set of sample points comprises:

means for selecting sample points so that sample points are distributed more densely in a first subset of the region of interest than in a second subset of the region of interest when the first subset of the region of interest has a greater influence on the quality of the three-dimensional image than the second subset of the region of interest.

20. An imaging device as recited in claim 19, wherein the means for applying the volume rendering process comprises means for using a ray casting process, and wherein the means for selecting a set of sample points within the region of interest comprises means for selecting a set of sample points within the region of interest, based on expected contributions of said sample points to said ray casting process.

21. An imaging device as recited in claim 20, wherein said ray casting process comprises defining a plurality of rays through the region of interest; and the imaging device further comprises:

means for limiting the set of sample points to a depth direction of the rays.

22. An imaging device as recited in claim 20, wherein said ray casting process comprises defining a plurality of rays through the region of interest; and wherein applying said volume rendering process to the CT values to create a three-dimensional image comprises:

not performing reconstruction for any sample point located beyond another sample point that has an opacity of 1.0 in a direction of said rays.

23. An imaging device as recited in claim 18, wherein:

the means for applying the volume rendering process comprises means for using a ray casting process which includes defining a plurality of rays through the region of interest;

the means for selecting a set of sample points within the region of interest comprises means for selecting a set of sample points within the region of interest, based on expected contributions of said sample points to said ray casting process; and the imaging device further comprises:

means for limiting the set of sample points to a depth direction of the rays.

\* \* \* \* \*